US010681382B1

(12) United States Patent
Brailovskiy

(10) Patent No.: US 10,681,382 B1
(45) Date of Patent: Jun. 9, 2020

(54) ENHANCED ENCODING AND DECODING OF VIDEO REFERENCE FRAMES

(71) Applicant: Amazon Technologies, Inc., Seattle, WA (US)

(72) Inventor: Ilya Vladimirovich Brailovskiy, Mountain View, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 348 days.

(21) Appl. No.: 15/385,626

(22) Filed: Dec. 20, 2016

(51) Int. Cl.
*H04N 19/59* (2014.01)
*H04N 19/61* (2014.01)
*H04N 19/167* (2014.01)
*H04N 19/182* (2014.01)
*H04N 19/63* (2014.01)
*H04N 19/105* (2014.01)
*H04N 19/187* (2014.01)
*H04N 19/58* (2014.01)
*H04N 19/159* (2014.01)
*H04N 19/172* (2014.01)

(52) U.S. Cl.
CPC .......... *H04N 19/63* (2014.11); *H04N 19/105* (2014.11); *H04N 19/159* (2014.11); *H04N 19/167* (2014.11); *H04N 19/187* (2014.11); *H04N 19/58* (2014.11); *H04N 19/172* (2014.11)

(58) Field of Classification Search
CPC .... H04N 19/63; H04N 19/105; H04N 19/159; H04N 19/167; H04N 19/187; H04N 19/58
USPC .................................................. 375/240.19
See application file for complete search history.

(56) References Cited

U.S. PATENT DOCUMENTS

| | | | |
|---|---|---|---|
| 5,434,623 A | 7/1995 | Coleman et al. | |
| 9,131,110 B2* | 9/2015 | Yassur | H04L 65/608 |
| 9,338,213 B2* | 5/2016 | Civanlar | H04L 12/4604 |
| 9,648,363 B2* | 5/2017 | Bei | H04N 19/46 |
| 9,854,270 B2* | 12/2017 | Ramasubramonian | H04N 19/52 |
| 2004/0001547 A1 | 1/2004 | Mukherje | |

(Continued)

OTHER PUBLICATIONS

Author Unknown, "H.264/MPEG-4 AVC" Available at: https://en.wikipedia.org/wiki/H.264/MPEG-4_AVC; 15 pages; (Nov. 8, 2016).

(Continued)

*Primary Examiner* — Zaihan Jiang
(74) *Attorney, Agent, or Firm* — K&L Gates LLP

(57) ABSTRACT

Techniques are generally described for compression encoding and decoding of video frames. In various examples, the techniques may include generating first reference frame data, first enhancement layer data corresponding to the first reference frame data, and second enhancement layer data corresponding to the first reference frame data. In various examples, the techniques may further include sending the first reference frame data, the first enhancement layer data, and the second enhancement layer data to at least one recipient computing device. The techniques may further include determining that the recipient computing device did not receive first unreceived data. In some examples, the first unreceived data may comprise at least one of the first reference frame data, the first enhancement layer data, and the second enhancement layer data. In other examples, the techniques may include resending the first unreceived data to the recipient computing device.

20 Claims, 9 Drawing Sheets

(56) References Cited

U.S. PATENT DOCUMENTS

| | | | |
|---|---|---|---|
| 2005/0012647 A1 | 1/2005 | Kadono et al. | |
| 2006/0188025 A1* | 8/2006 | Hannuksela | H04N 19/105 375/240.27 |
| 2007/0206673 A1* | 9/2007 | Cipolli | H04L 1/1607 375/240.1 |
| 2010/0166058 A1 | 7/2010 | Perlman et al. | |
| 2011/0135198 A1 | 6/2011 | Schuler | |
| 2012/0092452 A1* | 4/2012 | Tourapis | H04N 19/597 348/43 |
| 2012/0185570 A1 | 7/2012 | Bouazizi et al. | |
| 2014/0082054 A1* | 3/2014 | Denoual | H04N 21/85406 709/203 |
| 2014/0254669 A1 | 9/2014 | Rapaka et al. | |
| 2015/0085927 A1 | 3/2015 | Sjöberg et al. | |
| 2015/0304664 A1* | 10/2015 | Li | H04N 19/503 375/240.02 |
| 2015/0334420 A1* | 11/2015 | De Vleeschauwer | H04N 19/30 375/240.19 |
| 2016/0080833 A1* | 3/2016 | Denoual | H04N 21/234327 725/116 |
| 2016/0165244 A1* | 6/2016 | Bordes | H04N 19/50 382/233 |
| 2016/0330453 A1 | 11/2016 | Zhang et al. | |
| 2017/0359596 A1* | 12/2017 | Kim | H04N 19/59 |
| 2018/0007395 A1* | 1/2018 | Ugur | H04N 21/21805 |

OTHER PUBLICATIONS

Author Unknown, "Acknowledgement (data networks)" Available at: https://en.wikipedia.org/Wiki/Acknowledgement_(data_networks); 2 pages; (Dec. 16, 2016).

* cited by examiner

ENHANCED ENCODING AND DECODING OF VIDEO REFERENCE FRAMES

BACKGROUND

Video and/or other media may be sent between computing devices over a network. In some examples, videos may be encoded by a server, sent to a client computing device, decoded and played back while subsequent portions of the video are still being transmitted to the client computing device by the server. Such video transmission and playback is often referred to as "streaming". Network conditions can change during streaming due to changes and/or increases in network traffic. For example, network conditions may sometimes deteriorate which may lead to delays in streaming of video and/or other media files.

Provided herein are technical solutions to improve sending of video and other types of data that may reduce problems associated with changing network conditions.

DETAILED DESCRIPTION

Figure 1A:
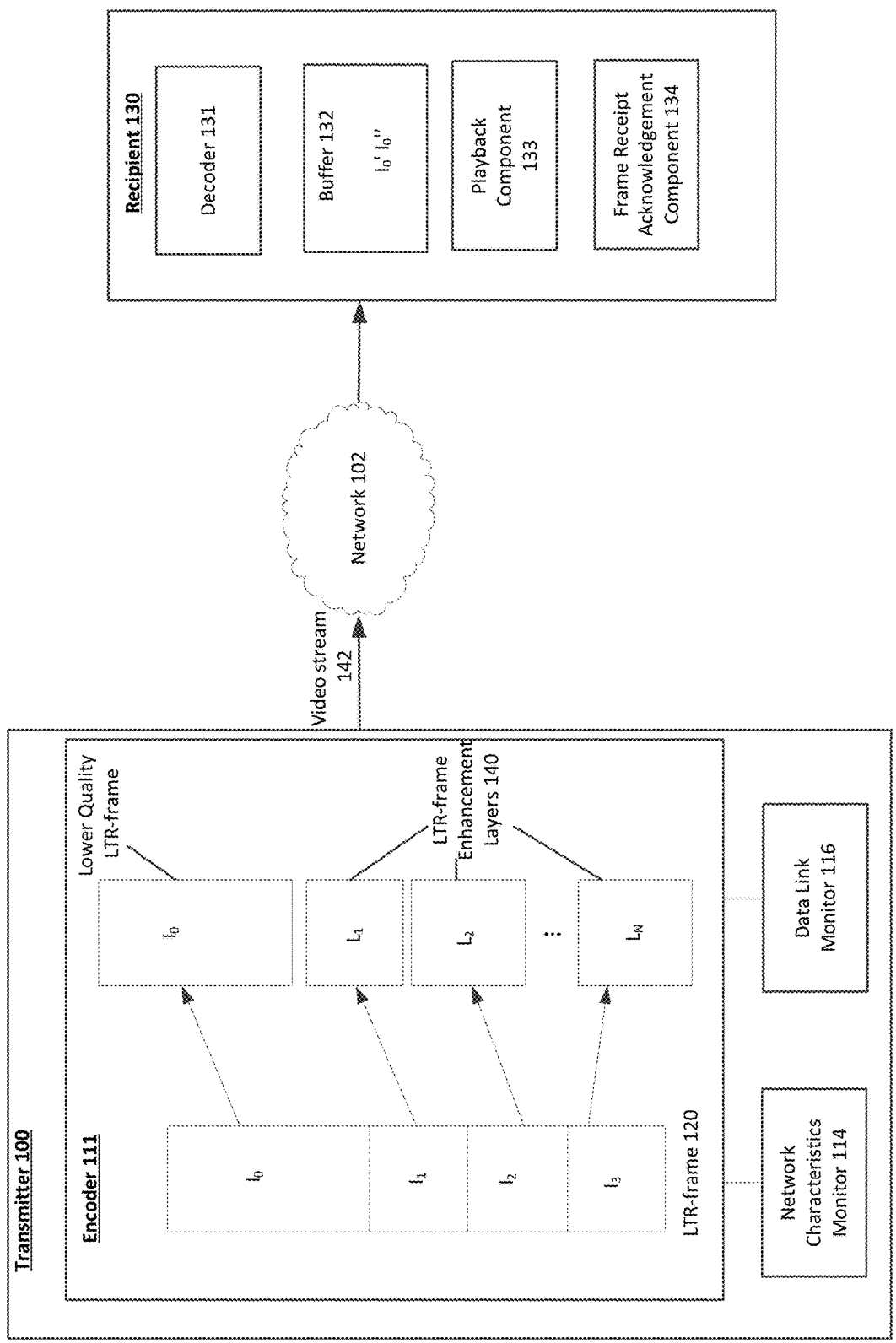
FIG. 1A depicts a system for enhanced encoding and decoding of a video bit stream, in accordance with various embodiments of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

The transmission and presentation of information using streaming delivery technology is rapidly increasing. Various forms of streaming technology and, in particular, hypertext transfer protocol (HTTP) streaming, may employ adaptive bitrate streaming, in which a video stream is encoded using multiple renditions that may differ with respect to various transmission attributes (e.g., bitrates, resolutions, profiles, frame rates, etc.). In adaptive bitrate streaming, video streams are encoded into small segments (typically 2-10 seconds), and each segment starts with an instantaneous decoder refresh frame (IDR-frame). An IDR-frame is a special intra-coded picture frame (sometimes referred to herein as a long term reference frame) that causes all reference pictures in the DPB (decoded picture buffer) to be flushed, so that no subsequent video frames can reference any picture prior to the IDR-frame. This means that each segment is self-decodable (i.e., does not depend on reference pictures in previous segments).

One challenge related to adaptive bitrate streaming is the desire to reduce end-to-end latency, jitter, and other undesirable effects caused by network conditions while maintaining a sufficiently high video quality. In adaptive bitrate streaming, larger segment durations may tend to increase latency. Thus, one technique for reducing latency involves the reduction of segment duration. However, the reduction of segment duration may result in more frequent transmission of I-frames, which have large data sizes and are computational resource intensive and inefficient to encode. Transmission of the I-frames can cause spikes in network traffic due to the larger data size of such frames relative to inter-coded frames.

Techniques for improved transmission and receipt of reference frames used in video streaming are described herein. In digital video technology, a video may be represented by a number of video frames that may be displayed in sequence during playback. A video frame is comprised of data representing rows and columns of pixels. The resolution of a particular video frame is sometimes described by the width of the frame, in terms of a first number of pixels, by the height of the frame, in terms of a second number of pixels. The data representing video frames may be compressed using different picture types or frame types, such as Intra-coded picture frames, predicted picture frames, and/or bi-predictive frames. The term "frame" can refer to the data representing an entire image captured during a time interval (e.g., all rows and columns of pixels comprising the particular image). The term "picture" refers to both frames and fields. A "field" is a partial image of a frame, which can be represented by, for example, data representing either the odd-numbered or even-numbered scanning lines of the frame. Generally, the "images", "videos", "frames", "fields" and "pictures" described herein comprise data representing the respective images, videos, frames, fields and pictures. In some examples, the data representing the various images, videos, frames, fields and pictures may be rendered on a display to produce one or more visible depictions of the underlying data.

Reference frames are frames of a compressed video that are used to define future frames and come in various types. A compressed video may comprise one or more frames that do not include all of the pixel data within the frames themselves, but rather reference pixel values of other frames (e.g., reference frames). Intra-coded picture frames ("I-frames") include detailed pixel data in order to be self-decodable and to provide reference pixel values for other inter-coded picture frames. As a result, I-frames and other long term reference frames do not require other video frames in order to be decoded, but provide the lowest amount of data compression. In some examples, a reference frame that is used as a reference for subsequent frames during a segment of the video may be referred to herein as a long term reference frame ("LTR frame"). Predicted picture frames ("P-frames") contain only the changes in the pixel values from the previous frame, and therefore P-frames use data from previous frames to decompress the P-frame. As a result, P-frames are more compressible than I-frames. Bi-predictive picture frames ("B-frames") can be decoded using both previous and forward frames for data reference. As set forth above, frequent transmission of I-frames can cause network congestion and/or jitter because of their increased size (e.g., the number of bits of data comprising the I-frame) relative to the P-frames and B-frames.

In accordance with embodiments of the present invention, frames used as reference frames in video streaming may be divided into multiple parts comprising a lower quality reference frame and a number of reference frame enhancement layers. For example, full quality LTR frame data may be divided into multiple parts for transmission, the multiple parts comprising lower (e.g., reduced) quality LTR frame data and a plurality of LTR frame enhancement layer data. In various other examples, lower quality LTR frames and enhancement layer data used to enhance the reference quality of the lower quality LTR frames may be generated from "raw" image data, such as image data captured by an image sensor of a camera. The size of the lower quality LTR frame data may be referred to as "lower" herein because the number of bits comprising the lower quality LTR frame may be less than the number of bits required to store an enhanced quality LTR frame resulting from the combination of the lower quality LTR frame with one or more LTR frame enhancement layer data. In some examples, the size of the lower quality LTR frame may be less than the size of the full quality LTR frame from which the lower quality LTR frame was generated.

In some further examples, the size of the lower quality LTR frame, in terms of a number of bits, may be similar to, or less than, data sizes of other inter-coded video frames, such as the P-frames and/or B-frames of the particular video stream being encoded. Accordingly, sending lower quality LTR frames may not result in the spikes in network traffic characteristic of full-quality LTR frames because the sizes of those lower quality LTR frames more closely compares to the sizes of inter-coded frames, such as P-frames and/or B-frames. Each of the LTR frame enhancement layers may be combined with and sent together with one of the subsequent inter-coded frames such as P-frames and/or B-frames in order to normalize frame data size among the frames of the particular adaptive bitrate video stream being encoded and sent to one or more recipient computing devices. For example, LTR frame enhancement layer data may be sent together with subsequent P-frame or B-frame data by including the LTR frame enhancement layer data in a payload of a transmission packet along with P-frame and/or B-frame data.

Although the examples described herein generally refer to improved encoding and decoding techniques for LTR frames, it will be understood that these techniques may be applied to any reference frame. For example, a P-frame may be divided into a lower quality P-frame and one or more P-frame enhancement layers, for transmission. Additionally, techniques such as those described herein, may be applied to other types of reference data that may be sent over a network using transmission packets that are relatively small in terms of a number of bits. Upon receipt, a recipient device may incrementally improve the quality of reference data by assembling a larger, more detailed file from the data from the plurality of transmission packets while reducing the amount of bandwidth required for transmission. Subsequently received files may benefit from the incrementally improved reference data.

Upon receipt of the video stream encoded in accordance with the techniques described above, a recipient computing device may reconstruct the full-quality reference frame (e.g., a full quality LTR frame) by combining the lower quality reference frame data (e.g., lower quality LTR frame data) and the plurality of enhancement layer data (e.g., LTR frame enhancement layer data) which have been received and stored in memory. The recipient computing device may incrementally improve the reference quality of the lower quality reference frame (e.g., an LTR frame) by incorporating image data of each enhancement layer (e.g., LTR frame enhancement layer data) with the image data of the previously-enhanced reference frame until the image data of the full-quality reference frame (e.g., a full-quality LTR frame) is reassembled in memory. Each subsequent inter-coded frame may benefit from incremental increases in reference quality due to the enhancement of the lower quality reference frame with received reference frame enhancement layers.

FIG. 1 depicts a transmitter 100 (e.g., one or more server computers) effective to encode a video stream for delivery to one or more recipients 130 (e.g., client computing devices) over a network 102, in accordance with various embodiments of the present disclosure. Network 102 may be, for example, a local area network (LAN) and/or a wide area network (WAN) such as the Internet. The video stream may be sent from transmitter 100 as video stream 142. Video stream 142 may include multiple renditions or may include a single rendition. Video stream 142 may be organized into video frames by encoder 111 of transmitter 100. A video frame may be, for example, a raster of pixels, with each pixel comprising a pixel value. Video frames may be sent from transmitter 100 over network 102 and received and presented by recipients 130 using streaming technology, in which a portion of the video stream may be presented by a recipient while subsequent portions of the video stream are simultaneously being sent to the recipient. For example, a prior portion of a video stream may be decoded and displayed by a recipient at the same time that a subsequent portion of the video stream 142 is still being sent to the recipient. In some examples, the encoded and transmitted image information may correspond to a live or nearly-live (e.g., with a short time delay of, for example, less than a few tenths of a second, less than a few seconds or less than a few minutes) transmission of an event, such as a playing of a video game, a news conference, real-time video conferencing, a sporting event, and many others. A live or nearly-live transmission of an event that is delivered using streaming technology may be referred to as live-streaming. It is noted however, that the transmission of information depicted in FIG. 1 is not limited to live or nearly-live transmission and may also include sending prior-recorded events, media, or other information. In some examples, video stream 142 may be sent to a recipient 130 as part of a large-scale video broadcast, in which video stream 142 is broadcast to a large quantity of recipients 130. It is noted however, that the enhanced LTR frame encoding and decoding techniques disclosed herein are not limited to large-scale video broadcasts and may also be employed for smaller-scale video broadcasts or even for video stream transmissions to a single recipient.

In the example of FIG. 1, transmitter 100 includes an encoder 111, a network characteristics monitor 114 and/or a data link monitor 116. In some examples, encoder 111 may encode a video stream 142 for transmission to recipient 130. Network characteristics monitor 114 may be effective to determine network conditions in a communication path between transmitter 100 and recipient 130. For example, network characteristics monitor 114 may determine the latency, available bandwidth, jitter, packet loss and/or other information related to communication between transmitter 100 and one or more recipients 130 over network 102. Data link monitor 116 may be effective to determine whether or not frames of image data sent by transmitter 100 to one or more recipients 130 were successfully received. For example, data link monitor 116 may be effective to receive and interpret one or more acknowledgement messages from a recipient 130. As is described in further detail below, acknowledgement message data may indicate that recipient 130 has received data sent from transmitter 100.

In various examples, encoder 111 may comprise a dedicated video encoder integrated circuit and/or video encoding software executable on a general purpose computer. Additionally, recipient 130 may include a respective decoder 131 for decoding of video stream 142. In various examples, decoder 131 may comprise a dedicated video decoder integrated circuit and/or video decoding software executable on a general purpose computer. Recipient 130 may also include one or more playback components 133 for playback of the sent video stream. Playback component 133 may be, for example, a media player, web browser, and/or another playback component software application executed using one or more processors of a computing device. In some examples, decoder 131 may be wholly or partially included within or integrated with one or more playback components 133. In some examples, video stream 142 may be sent using a communications protocol that is commonly employed for adaptive bitrate streaming, such as hypertext transfer protocol (HTTP). Recipient 130 may include a frame receipt acknowledgement component 134 effective to send acknowledgement messages 135 to one or more transmitters 100 upon receipt of an image frame or other packet of data sent to recipient 130 over network 102.

In some examples, a transmitted video stream may be encoded using a number of different renditions, which may each differ from one another with respect to one or more image quality-related attributes, such as bitrates, resolutions, profiles, frame rates, and others. Accordingly, in various examples, encoder 111 may encode video stream 142 in multiple, different renditions.

Encoder 111 may be effective to encode data into one or more frames, such as the LTR frames (e.g., I-frames) and inter-coded frames (e.g., P-frames and/or B-frames), described herein. Encoder 111 may be effective to identify an LTR frame 120 or other intra-coded reference frame. In an example, LTR frame 120 may be a first I-frame of a segment of the video stream 142. As previously noted, an LTR frame is typically much larger in size in terms of an amount of memory needed to store an LTR frame relative to inter-coded frames such as P-frames or B-frames. Encoder 111 may be effective to convert LTR frame 120 into a lower quality LTR frame $I_0$ and a plurality of LTR frame enhancement layers 140 (including LTR frame enhancement layers $L_1, L_2, \ldots, L_N$). In some examples, lower quality LTR frame $I_0$ may be of a lower bitrate relative to LTR frame 120, but may be the same resolution. In some other examples, encoder 111 may generate lower quality LTR frame $I_0$ from data that has not been previously encoded and/or compressed into a video format including intra-coded and/or inter-coded reference frames.

Figure 1B:
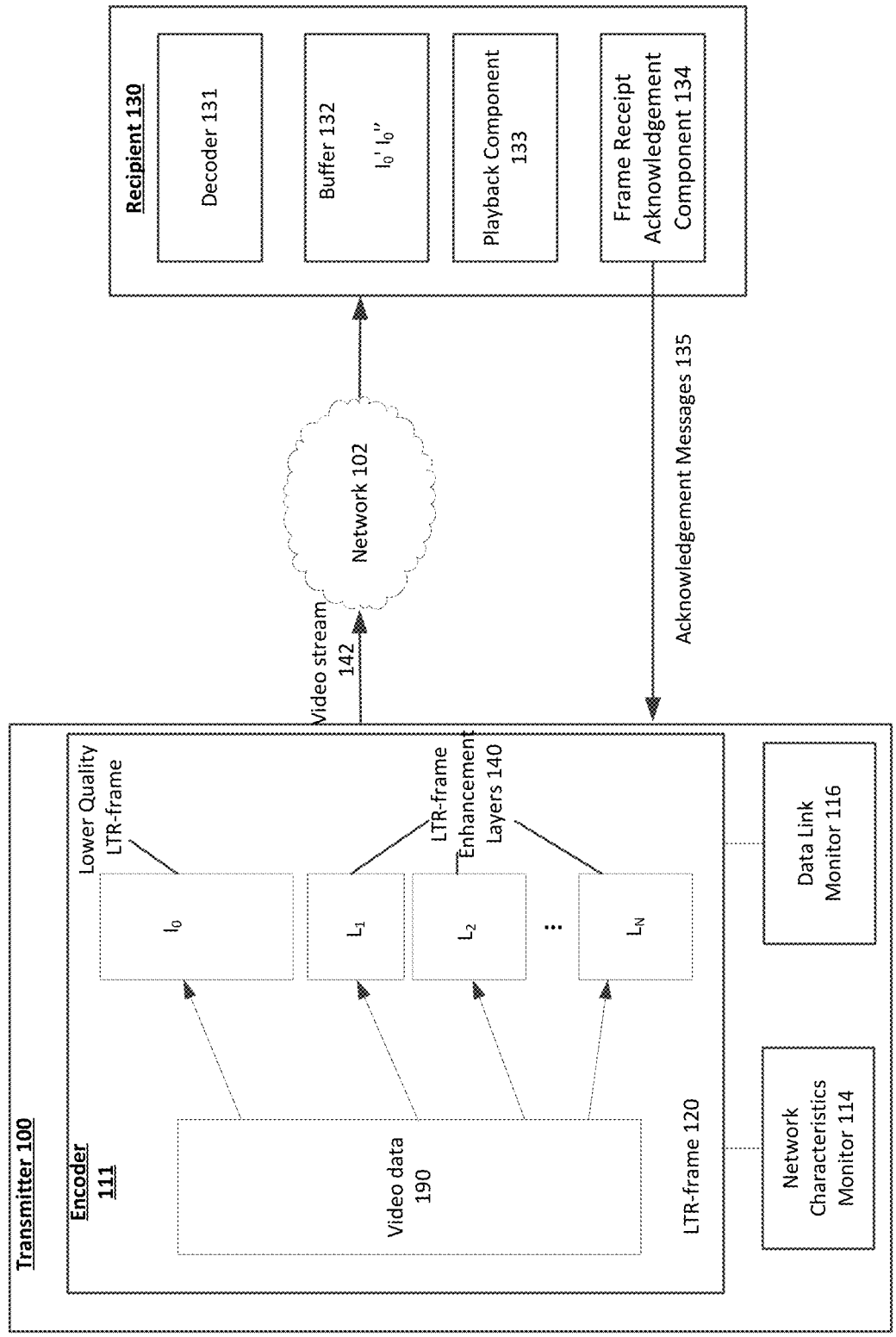
FIG. 1B depicts another system for enhanced encoding and decoding of a video bit stream, in accordance with embodiments of the present disclosure.

For example, as depicted in FIG. 1B, encoder 111 may receive video data 190. In some examples, video data 190 may be "raw" image data received from an image sensor of a camera and/or may be video data encoded into a non-native format with respect to a video format used by encoder 111 and/or decoder 131. Encoder 111 may be effective to encode video data 190 into a series of frames, such as the LTR frames and inter-coded frames described herein. Therefore, although conversion of a full-quality LTR frame 120 into a lower quality LTR frame $I_0$ is sometimes referred to and described herein, lower quality LTR frame $I_0$ may be generated from previously un-encoded video data, such as video data 190. Similarly, enhancement layers 140 may be generated from video data 190. A lower quality LTR frame $I_0$ generated from video data 190 may be referred to as "lower quality" because the LTR frame $I_0$ may comprise less detailed pixel data relative to an enhanced quality LTR frame $I_0'$ generated by incorporating image data of one or more enhancement layers into image data of lower quality LTR frame $I_0$, as will be described in further detail below.

Encoder 111 may divide the data comprising LTR frame 120 to generate a lower quality LTR frame $I_0$ having a lower bitrate relative to LTR frame 120 and one or more LTR frame enhancement layers 140 (represented in FIG. 1 as $L_1, L_2, \ldots, L_N$). As previously described, instead of dividing an LTR frame 120 to generate lower quality LTR frame $I_0$, lower quality LTR frame $I_0$ may be generated from video data 190. Dividing an LTR frame 120 to generate a lower quality LTR frame $I_0$ may comprise deleting image data from LTR frame 120 that is included in enhancement layers 140. Enhancement layers 140 may comprise image data that may be used to augment the quality of lower quality LTR frame $I_0$. Image data may be data related to pixels of the original LTR frame 120. Some examples of image data may include color value data, chroma/chrominance value data, luma/luminance value data and/or difference values between a current pixel value and a pixel value from a previous frame in video stream 142. Image data may be combined with and/or incorporated into current reference frame image data to improve the quality of a reference frame. For example, JPEG2000 pixel values may be comprised of various frequency bands. Image data included in enhancement layers $L_1, L_2, \ldots, L_N$ may be used to progressively improve the quality of pixel data in a current reference frame (e.g., lower quality LTR frame $I_0$) by progressively combining different frequency bands of pixel data with the image data of the current reference frame. For example, a first enhancement layer $L_1$ may include a low frequency band of pixel data. Enhancement layer $L_1$ may be combined with lower quality LTR frame $I_0$ to add low frequency pixel data to the reference frame $I_0$, resulting in a first enhanced quality LTR frame $I_0'$. A second enhancement layer $L_2$ may include a higher frequency band of pixel data. Enhancement layer $L_2$ may be combined with first enhanced quality I-frame $I_0'$ to add high frequency pixel data to first enhanced quality I-frame $I_0'$, resulting in a second enhanced quality I-frame $I_0''$.

In another example, LTR frame enhancement layer $L_1$ may include image data providing additional details related to chroma, chrominance, luma, luminance, or other parameters associated with pixels in LTR frame 120. As will be described in further detail below, decoder 131 of recipient 130 may combine LTR frame enhancement layer $L_1$ with lower quality LTR frame $I_0$. After combination of LTR frame enhancement layer $L_1$ with lower quality LTR frame $I_0$, the LTR frame resulting from the combination will be enhanced relative to lower quality LTR frame $I_0$ since the enhanced LTR frame includes new image data not included in lower quality LTR frame $I_0$. Accordingly, the enhanced LTR frame resulting from the combination of LTR frame enhancement layer $L_1$ and lower quality LTR frame $I_0$ may provide a better reference for decoding subsequently-received P-frames, B-frames, and/or other inter-coded frames.

In various examples, decoder 131 of recipient 130 may combine LTR frame enhancement layers $L_1, L_2, \ldots, L_N$ with lower quality LTR frame $I_0$ upon receipt of each of the LTR frame enhancement layers $L_1$, $L_2$, and $L_N$. The enhanced LTR frames resulting from the combination of lower quality LTR frame $I_0$ and one or more LTR frame enhancement layers 140 may be stored in a buffer 132 of recipient 130. Buffer 132 may be a memory configured to be in communication with decoder 131 and one or more processing units of recipient 130. Additionally, in some examples, upon the creation of a new enhanced LTR frame (e.g., LTR frames $I_0'$ and/or $I_0''$) based on receipt of an additional LTR frame enhancement layer 140, the previous LTR frame corresponding to the same time in video stream 142 may be overwritten in, or otherwise removed from, buffer 132.

For example, recipient 130 may initially receive lower quality LTR frame $I_0$ at a first time $t_0$. Thereafter, at a second time $t_1$, recipient 130 may receive a first LTR frame enhancement layer $L_1$ corresponding to lower quality LTR frame $I_0$. LTR frame enhancement layer $L_1$ may correspond to lower quality LTR frame $I_0$ because LTR frame enhancement layer $L_1$ and lower quality LTR frame $I_0$ were both created from the same full-quality, larger-sized LTR frame 120. Decoder 131 may combine image data of LTR frame enhancement layer $L_1$ with lower quality LTR frame $I_0$ to produce a first enhanced quality LTR frame $I_0'$. First enhanced quality LTR frame may be stored in buffer 132 for use as a reference by subsequently-received inter-coded frames. Thereafter, at a second time $t_2$ recipient 130 may receive a second LTR frame enhancement layer $L_2$ corresponding to lower quality LTR frame $I_0$. Decoder 131 may combine image data of LTR frame enhancement layer $L_2$ with first enhanced quality LTR frame $I_0'$ to produce a second enhanced quality LTR frame $I_0''$. Upon generation of second enhanced quality LTR frame $I_0''$, decoder 131 may overwrite first enhanced quality LTR frame $I_0'$ in buffer 132 with second enhanced quality LTR frame $I_0''$. Second enhanced quality LTR frame $I_0''$ may include all of the image data included in first enhanced quality LTR frame $I_0'$ plus additional image data included in second LTR frame enhancement layer $L_2$. Once recipient 130 has received all of the LTR frame enhancement layers 140 ($L_1$, $L_2$, and $L_3$, in the current example) decoder 131 may be effective to reproduce full quality LTR frame 120 by combining lower quality LTR frame $I_0$ with each of the subsequently received LTR frame enhancement layers 140. Sending LTR frame 120 as a smaller-sized lower quality LTR frame $I_0$ and a series of separately sent LTR frame enhancement layers 140 can avoid problems associated with sending very large LTR frames followed by a series of smaller-sized inter-coded frames. Such differences in frames size can cause unfavorable network conditions such as latency and jitter, and can cause buffer overflow on the recipient device. Accordingly, converting a full quality LTR frame, such as LTR frame 120, into a smaller, lower quality LTR frame $I_0$ and a series of enhancement layers 140 can reduce the variance in frame size for frames sent over network 102. In various examples, encoder 111 may select the size of lower quality LTR frame $I_0$ when generating lower quality LTR frame $I_0$ from full quality LTR frame 120. Encoder 111 may consider various factors when determining a size of lower quality LTR frame $I_0$ and/or when determining how many LTR frame enhancement layers to generate for a particular full-quality LTR frame 120. Such factors may include available bandwidth on a communication channel between transmitter 100 and recipient 130, average jitter and/or latency on the communication channel between transmitter 100 and recipient 130, the average size of inter-coded frames of video stream 142, and/or characteristics of recipient 130, such as a size of buffer 132 and/or a speed or type of decoding being used by decoder 131.

Figure 2:
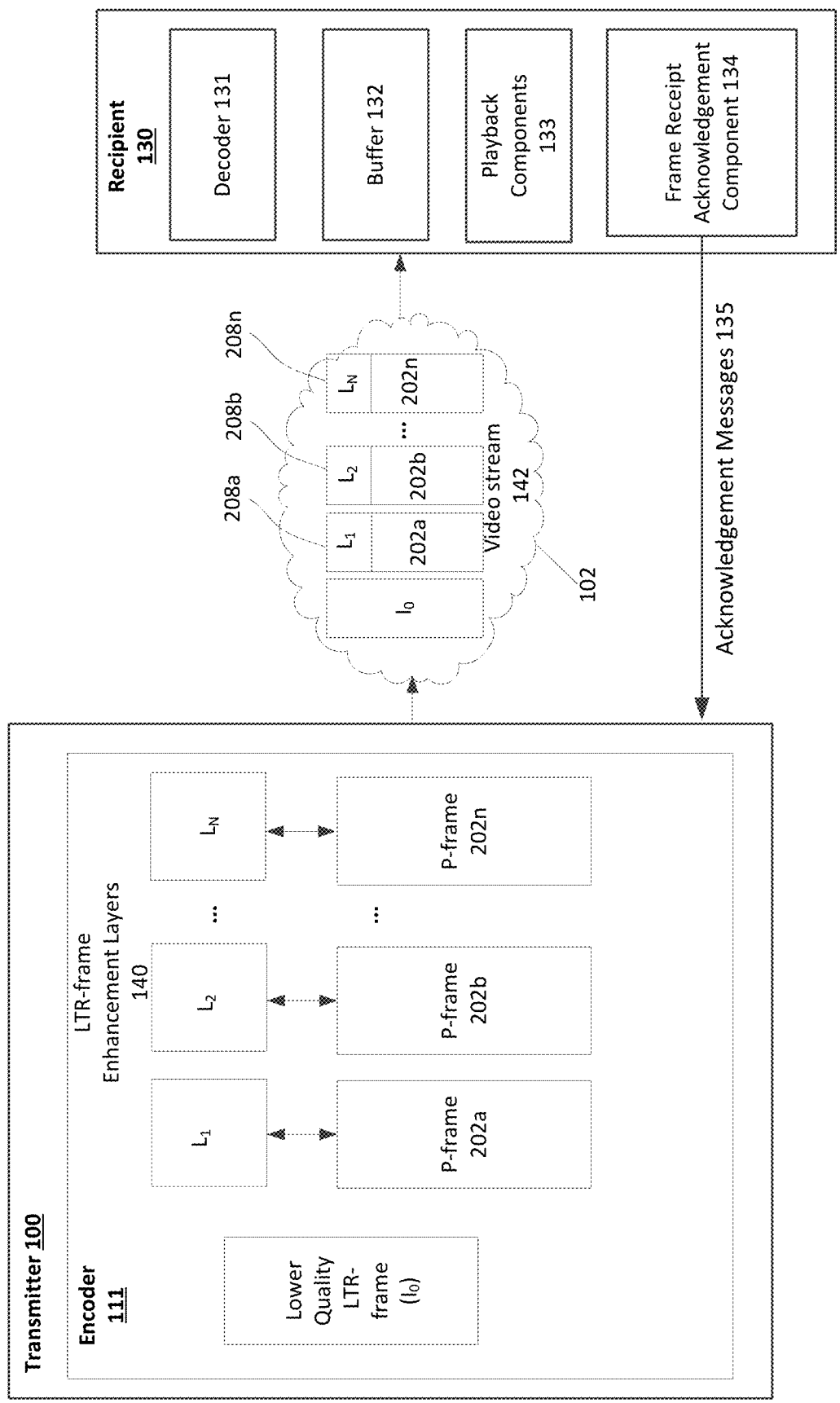
FIG. 2 depicts a transmitter computing device effective to encode a lower quality long term reference frame ("LTR frame") and a plurality of LTR frame enhancement layers, in accordance with various embodiments of the present disclosure.

FIG. 2 depicts a transmitter computing device effective to encode a lower quality LTR frame and a plurality of LTR frame enhancement layers. For example, encoder 111 may encode a lower quality LTR frame $I_0$ and a plurality of LTR frame enhancement layers 140, in accordance with various embodiments of the present invention. Those components of FIG. 2 described above with respect to FIG. 1 may not be described again herein for purposes of clarity and brevity. In some examples, encoder 111 may combine LTR frame enhancement layers 140 with various inter-coded frames such as P-frames or B-frames for transmission from transmitter 100 to recipient 130. For example, the image data of LTR frame enhancement layers 140 may be included in a payload of one or more P-frames 202. In the example shown in FIG. 2, encoder 111 may combine LTR frame enhancement layers $L_1, L_2, \ldots, L_N$ with respective P-frames $202a$, $202b, \ldots, 202n$. P-frames $202a$, $202b, \ldots, 202n$ may be sequential or non-sequential frames in video stream 142. Combination frames resulting from the combination of an LTR frame enhancement layer 140 and an inter-coded frame may be referred to herein as a "hybrid block." Hybrid blocks may be frames generated for transmission between a server computing device and one or more recipient computing devices. Hybrid blocks may be of a smaller size, in terms of a number of bits, relative to original LTR frame 120. Encoder 111 may encode indicator data in a NAL header of a hybrid block to identify and differentiate between inter-coded frame data and LTR frame enhancement layer data. Additionally, indicator data included in the NAL header of a hybrid block may be effective to indicate how such a block should be decoded by decoder 131. For example, indicator data in a header of a hybrid block may indicate that the first 128 bytes of data in the payload of the hybrid block represent the LTR frame enhancement layer data. The header may further include data identifying the particular LTR frame that is to be enhanced using the LTR frame enhancement layer data. For example, the header may include a time stamp identifying the particular LTR frame to be enhanced from among other frames of video stream 142.

In various examples, encoder 111 may select particular inter-coded frames for combination with LTR frame enhancement layers 140 so that the resulting hybrid blocks are less than or equal to a target frame size. Additionally, the lower quality LTR frame $I_0$ may be generated to be less than or equal to the target frame size. Accordingly, frame size may be normalized in the video stream 142. For example, a size of lower quality LTR frames $I_0$ may be selected that is within a tolerance band (e.g., +/−0.5%, 1%, 2%, 5%, 15%, 17%, 25%, 26.3%, etc.) of a target frame size. Similarly, particular inter-coded frames may be selected for combination with particular LTR frame enhancement layers 140 so that the resulting hybrid blocks are within a tolerance band of the target frame size.

In the example depicted in FIG. 2, encoder 111 has generated lower quality LTR frame $I_0$ and LTR frame enhancement layers $L_1, L_2, \ldots, L_N$ from full quality LTR frame 120 (shown in FIG. 1). As previously described, in some examples, instead of dividing an LTR frame 120 to generate lower quality LTR frame $I_0$, encoder 111 may generate lower quality LTR frame $I_0$ from video data 190. Encoder 111 combines LTR frame enhancement layers $L_1, L_2, \ldots, L_N$ with respective P-frames 202a, 202b, ..., 202n to form hybrid blocks 208a, 208b, ..., 208n. In some examples, hybrid blocks 208a, 208b, ..., 208n generated by encoder 111 may be within a specified tolerance of a target frame size. Transmitter 100 may send lower quality LTR frame $I_0$ and hybrid blocks 208a, 208b, ..., 208n over network 102 to recipient 130. As described in further detail below, frame receipt acknowledgement component of recipient 130 may acknowledge receipt of enhancement layer data (e.g., hybrid blocks 208a, 208b, ..., 208n) and may send an acknowledgement message over network 102 to verify the receipt of each hybrid block 208, and/or may send acknowledgement messages to verify receipt of lower quality LTR frame $I_0$ and/or LTR frame enhancement layers $L_1, L_2, \ldots, L_N$. It should be noted that although in the example depicted in FIG. 2, the LTR frame enhancement layers $L_1, L_2, \ldots, L_N$ are combined with P-frames 202a, 202b, ..., 202n, LTR frame enhancement layers $L_1, L_2, \ldots, L_N$ could instead be combined with other types of inter-coded frames, such as B-frames or may be sent separately without combination and/or concatenation with an inter-coded frame.

Figure 3:
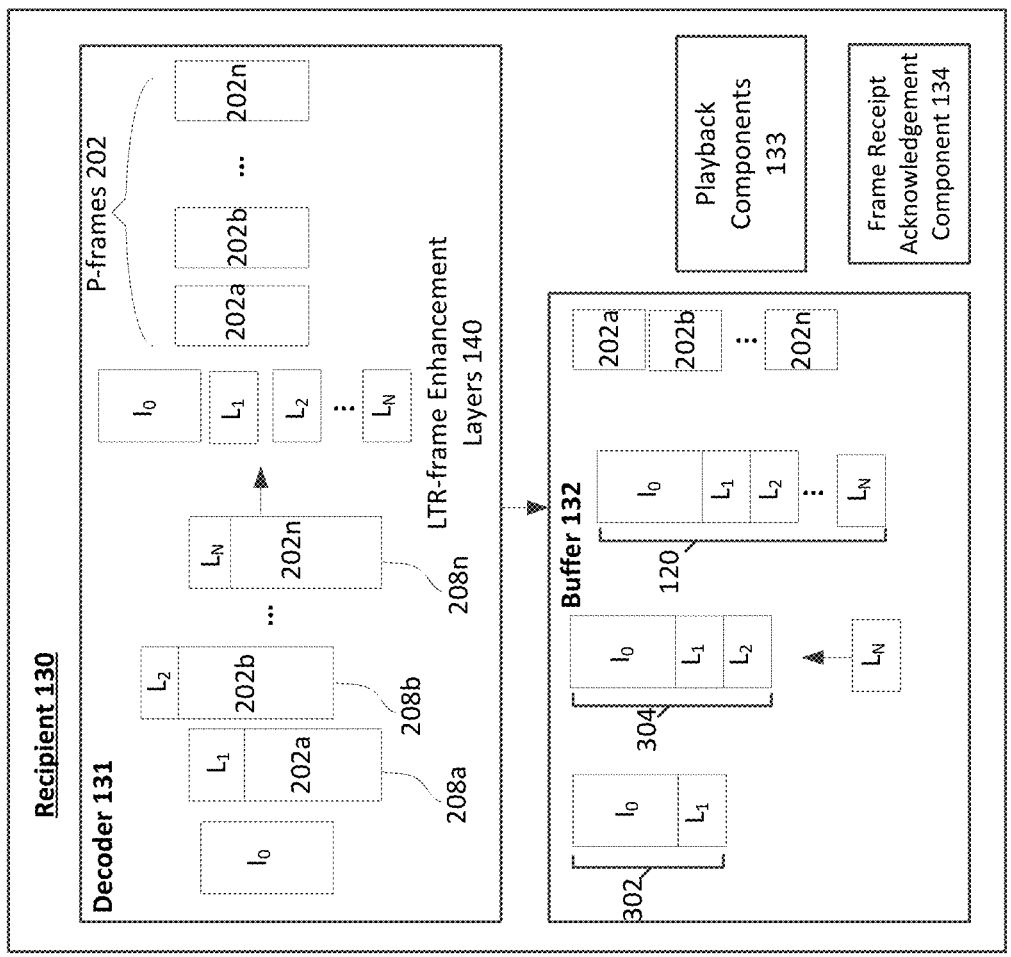
FIG. 3 depicts a recipient computing device effective to decode the lower quality LTR frame and the plurality of hybrid blocks depicted in FIG. 2, in accordance with embodiments of the present disclosure.

FIG. 3 depicts a recipient computing device 130 effective to decode the lower quality LTR frame $I_0$ and the plurality of hybrid blocks 208 depicted in FIG. 2, in accordance with embodiments of the present invention. Those components of FIG. 3 described previously with respect to FIGS. 1-3 may not be described again herein for purposes of clarity and brevity.

As illustrated in FIG. 3, decoder 131 of recipient 130 may receive lower quality LTR frame $I_0$. Decoder 131 may decode lower quality LTR frame $I_0$ and store the lower quality LTR frame $I_0$ in buffer 132. Decoder 131 may receive hybrid blocks 208a, 208b, ..., 208n. Header data, such as NAL header data of hybrid blocks 208a, 208b, ..., 208n, may be used by decoder 131 to identify and separate hybrid blocks 208a, 208b, ..., 208n. For example, header data may be used by decoder 131 to separate hybrid blocks into LTR frame enhancement layer data, such as image data for LTR frame 120 (shown in FIG. 1A), and inter-coded P-frame data, such as data required to decode and display P-frames 202. Header data may include one or more indicator bits and/or flags specifying locations of the relevant portions of inter-coded frame data and/or LTR frame enhancement layer data and identifying the inter-coded frame data and/or LTR frame enhancement layer data.

As indicated by the arrow depicted within decoder 131 in FIG. 3, upon receipt of a particular hybrid block decoder 131 may separate the LTR frame enhancement layer data included in the hybrid block from the inter-coded frame data. In an example, recipient 130 may receive lower quality LTR frame $I_0$ at a time $t_0$. Decoder 131 may decode lower quality LTR frame $I_0$ and store $I_0$ in buffer 132, as indicated by the downward arrow between decoder 131 and buffer 132. While lower quality LTR frame $I_0$ is stored in buffer 132, $I_0$ may be used as a reference to decode subsequently-received and/or concurrently received inter-coded frames. Recipient 130 may receive hybrid block 208a at a time $t_1$. Decoder 131 may separate LTR frame enhancement layer $L_1$ (including image data of LTR frame enhancement layer $L_1$) from P-frame data 202a. P-frame data 202a may be stored in buffer 132. Decoder 131 may combine image data of LTR frame enhancement layer $L_1$ with lower quality LTR frame $I_0$ to produce a first enhanced quality LTR frame 302. In some examples, decoder 131 may use first enhanced quality LTR frame 302 as a reference frame to decode P-frame data 202a. In various other examples, first enhanced quality LTR frame 302 may be used as a reference for subsequently received inter-coded frames (e.g., P-frame data 202b). As described previously, adding LTR frame enhancement layer data, such as pixel value differences and/or updates, to a lower quality LTR frame $I_0$ (such as lower quality LTR frame $I_0$) may increase the quality of the newly modified LTR frame (e.g., first enhanced quality LTR frame 302) such that the newly modified frame may provide a better reference for subsequent inter-coded frames. Decoder 131 may store first enhanced quality LTR frame 302 in buffer 132. First enhanced quality LTR frame 302 may be used as a reference to decode subsequently-received inter-coded frames while first enhanced quality LTR frame 302 is stored in buffer 132.

To continue the example, recipient 130 may receive hybrid block 208b at a time $t_2$. Decoder 131 may separate LTR frame enhancement layer data $L_2$ (including image data of LTR frame enhancement layer $L_2$) from P-frame data 202b. P-frame data 202b may be stored in buffer 132. Decoder 131 may combine LTR frame enhancement layer $L_2$ with first enhanced quality LTR frame 302 to produce a second enhanced quality LTR frame 304. Adding additional enhancement layer data, such as pixel value updates and/or differences, to first lower quality LTR frame 302 to produce second enhanced quality LTR frame 304 may provide a better reference frame for subsequently-received inter-coded frames. Decoder 131 may store second enhanced quality LTR frame 304 in buffer 132. Second enhanced quality LTR frame 304 may be used as a reference to decode subsequently-received inter-coded frames while second enhanced quality LTR frame 304 is stored in buffer 132.

Decoder 131 may continue to receive and separate hybrid blocks until a final hybrid block 208n is received for a particular full-quality LTR frame 120 at a time $t_N$. Decoder 131 may separate LTR frame enhancement layer data $L_N$ from P-frame data 202n. P-frame data 202n may be stored in buffer 132. Decoder 131 may combine LTR frame enhancement layer $L_N$ with the currently-stored enhanced quality LTR frame (e.g., second enhanced quality LTR frame 304 or the most recently stored enhanced quality LTR frame) to reassemble full-quality LTR frame 120. Decoder 131 may store full quality LTR frame 120 in buffer 132. Full-quality LTR frame 120 may be used as a reference to decode subsequently-received inter-coded frames until an instantaneous decode refresh frame (IDR frame) is used to clear buffer 132.

Frame receipt acknowledgement component 134 may send acknowledgement messages to transmitter 100 to acknowledge receipt of lower quality LTR frame $I_0$, hybrid blocks 208a, 208b, ..., 208n, and/or LTR frame enhancement layer data included in hybrid blocks 208a, 208b, ..., 208n. In other examples, frame receipt acknowledgement component 134 may send negative acknowledgement ("NACK") messages to transmitter 100 when frame receipt acknowledgement component 134 and/or decoder 131 determines that a particular image frame or a particular enhancement layer has not been received during a time period within which the frame or enhancement layer was expected.

Figure 4:
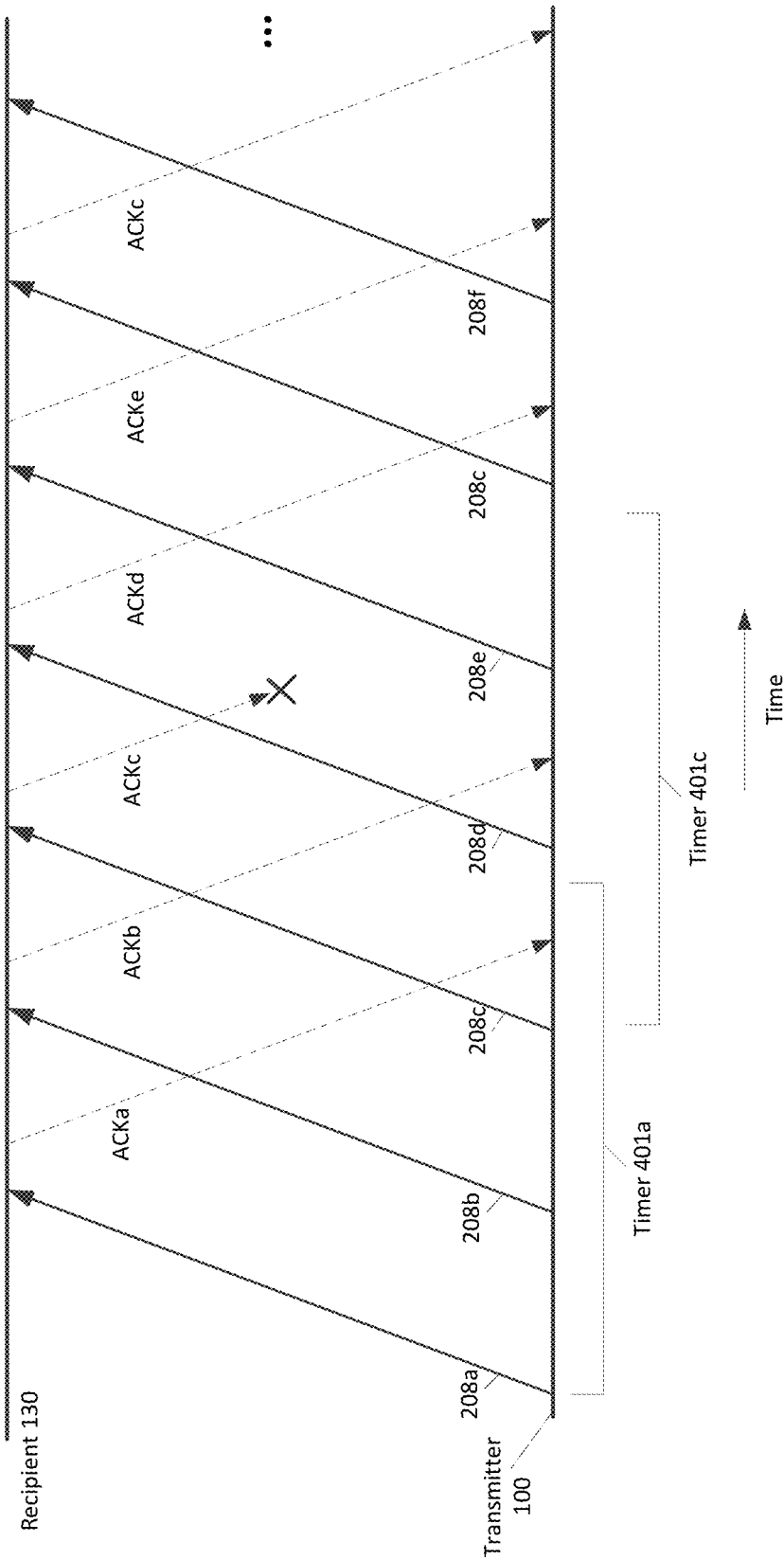
FIG. 4 depicts an example technique that may be used to verify transmission and receipt of lower quality LTR frame $I_0$ and LTR frame enhancement layers, in accordance with various embodiments of the present disclosure.

FIG. 4 depicts an example technique that may be used to verify transmission and receipt of hybrid blocks 208a, 208b, . . . , 208n, and/or LTR frame enhancement layers $L_1$, $L_2$, . . . , $L_N$. Although the example depicted in FIG. 4 shows hybrid blocks 208 being acknowledged by recipient 130, lower quality LTR frame $I_0$, other LTR frames such as instantaneous decoder refresh frames, and/or LTR frame enhancement layers may be acknowledged in a similar fashion. The techniques depicted in FIG. 4 and described herein may be used to verify receipt of other types of data, such as communication protocol handshake data, encryption data, error correction data, metadata related to image frames, or any other type of data sent from transmitter 100 to one or more recipients 130.

The example depicted in FIG. 4 shows hybrid blocks 208a, 208b, 208c, 208d, 208e, and 208f being sent by transmitter 100 to recipient 130. Recipient 130 sends acknowledgement message data (e.g., ACKa, ACKb, ACKc, . . . ) for every non-corrupted hybrid block that it receives. The acknowledgement message data is effective to identify the block that has been received by recipient 130. For example, acknowledgement message data "ACKa" indicates to transmitter 100 that recipient 130 has received non-corrupted hybrid block 208a. Similarly, ACKc indicates to transmitter 100 that recipient 130 has received non-corrupted hybrid block 208a.

In some examples, transmitter 100 may initiate a timer upon the sending of each of hybrid blocks 208a, 208b, . . . , 208n. For example, transmitter may initiate a first timer when sending hybrid block 208a, a second timer when sending hybrid block 208b, etc. In various examples, transmitter 100 may initiate the various timers in order to determine amounts of time that has elapsed since sending the various hybrid blocks. Upon expiration of a timer (i.e., upon the amount of elapsed time exceeding a timeout threshold), if transmitter 100 has not received an acknowledgement message associated with the particular timer, transmitter 100 may be programmed to re-send the particular data associated with the timer. For example, as depicted in FIG. 4, timer 401a is initiated by transmitter 100 upon sending hybrid block 208a to recipient 130. Hybrid block 208a is received by recipient 130. Recipient 130, in turn, sends acknowledgement message ACKa to transmitter 100. Acknowledgement message ACKa is received by transmitter 100 prior to timer 401a experiencing a timeout. Accordingly, transmitter 100 continues to send the next sequential data to be transmitted to recipient 130 (e.g., hybrid block 208d) and does not re-send hybrid block 208a.

In another example depicted in FIG. 4, timer 401c is initiated by transmitter 100 upon sending hybrid block 208c to recipient 130. Hybrid block 208c is received by recipient 130. Recipient 130, in turn, sends acknowledgement message ACKc to transmitter 100. However, acknowledgement message ACKc is misrouted and is not received by transmitter 100. Accordingly, timer 401c experiences a timeout. Thereafter, transmitter 100 re-sends hybrid block 208c. After re-sending the unacknowledged hybrid block 208c, transmitter 100 may resume sending the next sequential hybrid block (e.g., hybrid block 208f in the example depicted in FIG. 4).

The example acknowledgement techniques shown and described above in reference to FIG. 4, are but one example of network communication acknowledgement that may be used in accordance with the present disclosure. Other examples of network communication acknowledgement include the "Stop and Wait" method, whereby the sending device waits for the acknowledgement of each data frame prior to sending the next data frame. Another example includes the "Sliding Window" method, in which the sending device and receiving device agree upon a number of data frames that may be transmitter prior to sending an acknowledgement acknowledging one or more of the data frames. Another example includes the "Go Back N" method, in which the sending device continues to send data frames until a negative acknowledgement ("NACK") is received, or until no acknowledgement has been received for a particular frame prior to the timeout of a corresponding timer. Upon such a NACK or timeout, the sending device retransmits the frame for which the NACK or timeout was experienced and all subsequent frames.

In various examples, the techniques described above may be implemented by data link monitor 116 and/or frame receipt acknowledgement component 134 depicted in FIG. 1A. Using such acknowledgement techniques may have a number of advantages. For example, if a recipient device, such as recipient 130 receives enhancement layer data, such as LTR frame enhancement layers $L_1$, $L_2$, . . . , $L_N$ without receiving the reduced quality LTR frame $I_0$ identified by header data of the enhancement layers, the recipient 130 may request the reduced quality LTR frame $I_0$. Alternately, in the current example, transmitter 100 may determine that the reduced quality LTR frame $I_0$ was not received as a corresponding acknowledgement (e.g., $ACK_0$) was not received prior to a timeout of a timer for reduced quality LTR frame $I_0$. Accordingly, transmitter 100 may resend the reduced quality LTR frame $I_0$. Similarly, transmitter 100 and/or recipient 130 may determine whether or not any of hybrid blocks 208, LTR frames, inter-coded frames (e.g., P-frames and/or B-frames), or any other data sent between transmitter 100 and recipient 130 has been successfully sent and received.

In various examples, a region of interest present in image frame data may be identified. For example, a user of a computing device in communication with recipient 130 may identify a particular portion of the image. In another example, computer vision techniques may be used to identify a region of interest. In yet other examples, the region of interest may be specified by encoder 111, by transmitter 100, by recipient 130, and/or by decoder 131.

For example, a portion of image data in a frame of image data may represent a human and that portion of image data representing the human may be identified as a region of interest for the particular image frame. The portion of image data may represent a human because, when the portion of image data is rendered on a display, the portion may depict a human. A computing device, such as recipient 130 may determine that the quality of the image data for the region of interest should be improved. In an example, during a video conference, a person that is speaking or leading a presentation may be identified as a region of interest. The recipient 130 may determine that the quality of the image depicting the speaker should be improved. The recipient 130 may request one or more enhancement layers corresponding to the region of interest in a reference frame. Encoder 111 of transmitter 100 (FIG. 1A) may generate one or more enhancement layers for a reference frame that includes the region of interest. The enhancement layers may include additional pixel data (e.g., high frequency chrominance and/or luminance data) that may be used to improve the quality of the reference frame for the region of interest (e.g., the presenter). Frames of the video that are received subsequently may benefit from the enhanced region of interest in the reference frame. In some examples, a wavelet transform may be used by encoder 111 to encode the image data (e.g., LTR frame 120 and/or video data 190) into a lower quality reference frame and one or more enhancement layers, such as the various types of enhancement layers discussed herein. In an example, wavelet based encoding may be used to separate a LTR frame into a reduced quality LTR frame, including predominantly low frequency pixel data, and one or more LTR frame enhancement layers, including higher frequency pixel data.

In various further examples, decoder 131 may monitor the quality of the image data being received. For example, image quality may be determined using peak signal to noise ratio (PSNR) and/or structural similarity index (SSIM) methodology. Decoder 131 and/or recipient 130 may request enhancement layer data in response to a reduction in quality and/or to the quality falling below a threshold level. Enhancement layer data for LTR frames may be sent asynchronously when network conditions permit. For example, network characteristics monitor 114 of transmitter 100 may determine when sufficient bandwidth is available for sending enhancement layer data to improve image quality. In some additional examples, metadata related to an image frame, a region of interest, or a video being sent from transmitter 100 to recipient 130 may be sent when sufficient bandwidth is available for sending enhancement layer data. Such metadata may be sent as enhancement layer data and may be associated with a reference frame stored in buffer 132 of recipient 130 (depicted in FIG. 1A). Examples of such metadata may include information about content of the image (e.g., information about a person in the image), computer vision data, the definition of a region of interest (e.g., in terms of locations within the image frame), security content, edge detection information, flow level information, etc. In some examples, metadata that describes the location of a region of interest may not necessarily locate the region of interest within rectangular data of an image frame. Instead, in at least some examples, metadata may describe the location of interest using a binary tree and/or a fractal representation.

In some examples, ACK messages sent by recipient 130 may include instructions for encoder 111. For example, ACK messages may include instructions for encoding content of subsequent frames of image data encoded by encoder 111. For example, after receiving a particular enhancement layer, recipient device 130 may determine that, for a particular region of an image frame, sufficient enhancement data has been received to produce an image of acceptable image quality when rendered on a display. Accordingly, recipient 130 may provide an ACK message to transmitter 100 indicating successful receipt of the particular enhancement layer and instructing the encoder 111 of transmitter 100 not to encode further enhancement layer data for the particular region. In some further examples, the recipient may instruct the encoder 111 to provide enhancement data related to a different region of the image frame.

In an example, recipient 130 may be receiving video conference data. The video conference data may depict a woman with whom a user of recipient device 130 is speaking in a video conference setting. In the image data the woman may be sitting in front of a static background. Recipient 130 may receive an enhancement layer related to the background. Recipient 130 may determine that sufficient enhancement layer data has been received related to the background of the image. Recipient 130 may send instructions in an ACK message to transmitter 100 to use skip macroblocks to encode the background rather than background image data. Recipient 130 may also provide instructions to enhance the image data representing the woman, rather than the static background. Accordingly, encoder 111 of transmitter 100 may encode enhancement layer data related to the woman and may use skip macroblocks to represent the static background in the image data. A skip macroblock may be a macroblock for which no information is sent to the decoder. Accordingly, no bits representing the skip macroblock need be sent from the transmitter 100 to the recipient 130. In another example, an ACK message from recipient 130 to transmitter 100 may include instructions to reduce the resolution of subsequent frames of image data or of particular regions within subsequent frames of image data.

Figure 5:
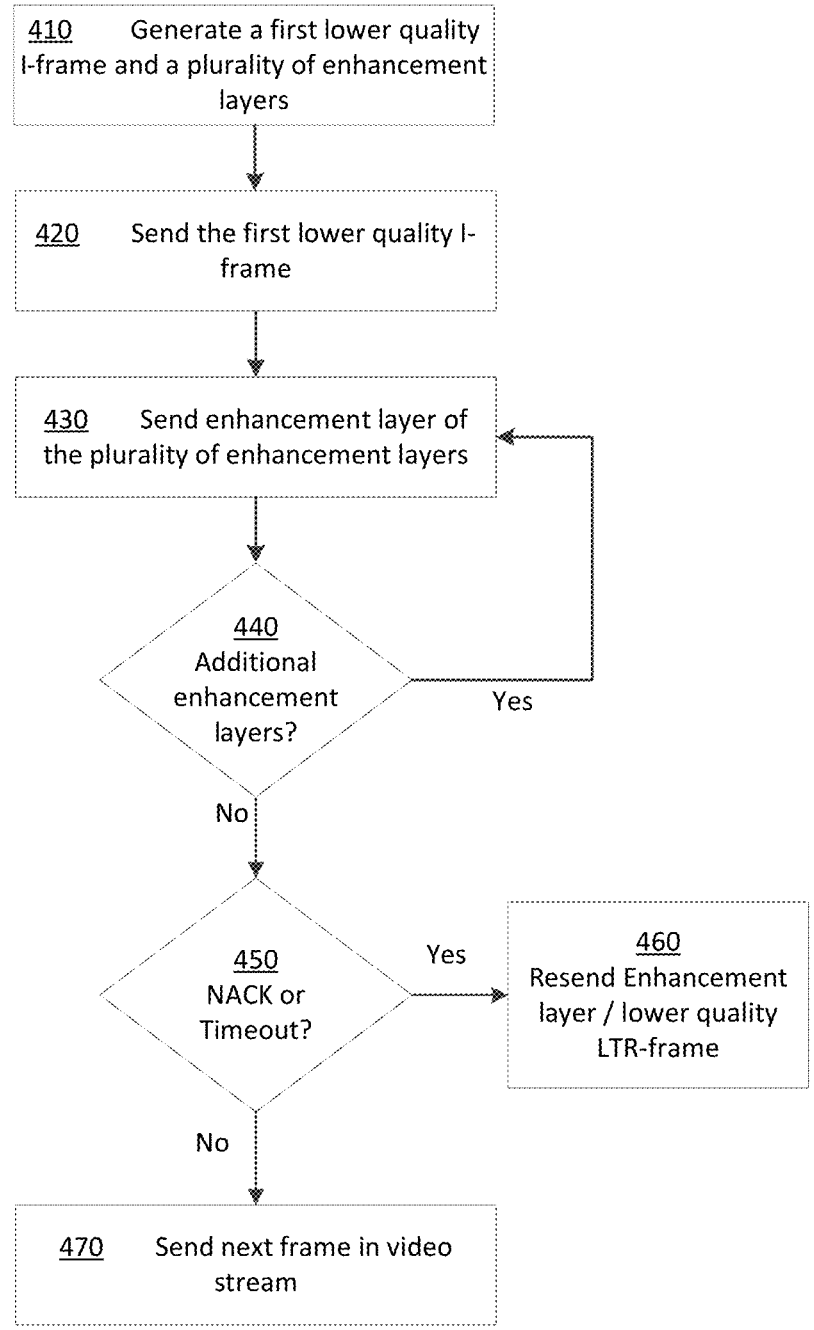
FIG. 5 depicts a flowchart illustrating an example process for enhanced LTR frame encoding and acknowledgement, in accordance with embodiments of the present disclosure.

FIG. 5 is a flowchart illustrating a first example process for enhanced LTR frame encoding and acknowledgement that may be used in accordance with the present disclosure. In some examples, the process of FIG. 5 may be performed by a transmitter computing device (e.g., server) that receives a request for a video streaming transmission, such as transmitter 100 depicted in FIGS. 1A and 1B. In some examples, transmission of a video stream may be requested as part of a broadcast to multiple recipients, such as a large-scale video broadcast. In some examples, the requested video stream may be sent using a communications protocol that is commonly employed for adaptive bitrate streaming, such as hypertext transfer protocol (HTTP). In some other examples, the process of FIG. 5 may be performed prior to receiving a request for a video streaming transmission. For example, the process of FIG. 5 may be performed to encode video data received from a camera or other device for later transmission or streaming. The process in FIG. 5 is described with reference to I-frames to illustrate an example of a type of LTR frame that may be used in accordance with the present disclosure. Although I-frames are described in FIG. 5, other LTR frames and other data frames may instead be used in accordance with the present disclosure.

The process of FIG. 5 may begin at operation 410 at which a first lower quality I-frame and a plurality of enhancement layers is generated. For example, transmitter 100 may identify a first I-frame (e.g., I-frame 120 of FIG. 1) of the requested video stream (e.g., video stream 142 depicted in FIG. 1). An encoder of transmitter 100 may divide the data comprising the identified I-frame into a lower quality I-frame and a plurality of enhancement layers corresponding to the lower quality I-frame. For example, with reference to FIG. 1, encoder 111 may identify I-frame 120 which may be a frame of 0.5 MB in size (in various examples, I-frames may typically range between 100 kB-700 kB in size, depending on resolution). Encoder 111 may generate a lower quality I-frame $I_0$ and enhancement layers $L_1$, $L_2$, and $L_3$ corresponding to lower quality I-frame $I_0$. In the example, lower quality I-frame $I_0$ may have a size of 200 kB and each of enhancement layers $L_1$, $L_2$, and $L_3$ may have a size of about 100 kB. As previously described, in some examples, instead of dividing an I-frame 120 to generate lower quality I-frame $I_0$, encoder 111 may generate lower quality I-frame $I_0$ and/or enhancement layers $L_1$, $L_2$, and $L_3$ from previously un-encoded and/or uncompressed video data, such as video data 190 depicted in FIG. 1B.

As described previously, each of enhancement layers $L_1$, $L_2$, and $L_3$ may be used to improve lower quality I-frame $I_0$. For example, enhancement layers $L_1$, $L_2$, and $L_3$ may include image data combinable with lower quality I-frame $I_0$ by an enhanced I-frame decoder of a recipient computing device to generate an enhanced quality I-frame $I_0'$. In the example, an enhanced I-frame decoder may be effective to combine enhancement layers $L_1$, $L_2$, and $L_3$ with lower quality I-frame $I_0$ to reassemble the initial full-quality I-frame, such as I-frame 120 depicted in FIG. 1.

The process may continue from operation 410 to operation 420 at which the first lower quality I-frame may be sent from the transmitter to the recipient device. For example, with reference to FIG. 1, transmitter 100 may be effective to send lower quality I-frame $I_0$ to recipient 130 over network 102.

The process may continue from operation 420 to operation 430 at which an enhancement layer of the plurality of enhancement layers is sent. For example, with reference to FIG. 2, transmitter 100 may send I-frame enhancement layer $L_1$ to recipient 130. In some examples, I-frame enhancement layer $L_1$ may be packaged together with an inter-coded frame in a hybrid block, such as hybrid block 208a depicted in FIG. 2. As previously described, hybrid blocks may include header data that may indicate to an enhanced I-frame decoder (such as decoder 131 depicted in FIGS. 1-4) the data corresponding to the inter-coded frame and the data corresponding to the I-frame enhancement layer in the particular hybrid block. Additionally, in various examples, the header data may indicate a particular I-frame with which the I-frame enhancement layer data is to be combined to generate an enhanced quality I-frame.

The process may continue from operation 430 to operation 440 at which a determination is made whether or not additional enhancement layers corresponding to the lower quality I-frame are to be sent. For example, with reference to FIG. 2, encoder 111 may determine that I-frame enhancement layer $L_2$ has not yet been sent to recipient 130. In some examples, encoder 111 may package I-frame enhancement layer $L_2$ together with an inter-coded frame such as P-frame 202b in a hybrid block 208b, as depicted in FIG. 2. The process may then return to operation 440 and enhancement layer $L_2$ may be sent to recipient 130 in hybrid block 208b. I-frame enhancement layers need not be sent together with inter-coded frames. In some examples, I-frame enhancement layers may be sent independently from other data. Additionally, I-frame enhancement layers may be sent out-of-band with respect to other video frames in video stream 142.

At operation 450 a determination may be made whether a negative acknowledgement message (NACK) has been received or a timeout has occurred for a timer related to transmission of particular enhancement layer data and/or a reduced quality I-frame or other LTR frame. If a NACK has been received or a timeout has occurred for a particular piece of transmitted data, the process may continue from operation 450 to operation 460. At operation 460, the piece of data corresponding to the timeout or the piece of data for which the NACK message has been received may be resent to recipient 130.

If no NACK message has been received and no timeout has occurred, the process may continue from operation 450 to operation 470, "Send next frame in video stream", at which the next frame in the video stream may be sent. For example, with reference to FIG. 2, if all enhancement layers $L_1$-$L_N$ have been sent from transmitter 100 to recipient 130, transmitter 100 may send the next frame of video stream 142 to recipient 130. In an example, the next frame in video stream 142 may be a P-frame, another enhancement layer, an LTR frame, a metadata enhancement layer frame, etc. In the example where the next frame in video stream 142 is a P-frame, the P-frame may be decoded using an enhanced I-frame or other enhanced LTR frame as a reference frame. The enhanced I-frame may be generated by combining one or more of the transmitted I-frame enhancement layers and the lower quality I-frame. Indeed, in many cases, the full-quality I-frame (such as I-frame 120 depicted in FIG. 1A) may have been reassembled by a decoder of the recipient 130. In such a case, the P-frame may use the full-quality I-frame reassembled from the plurality of enhancement layers and the lower quality I-frame as a reference frame.

Figure 6:
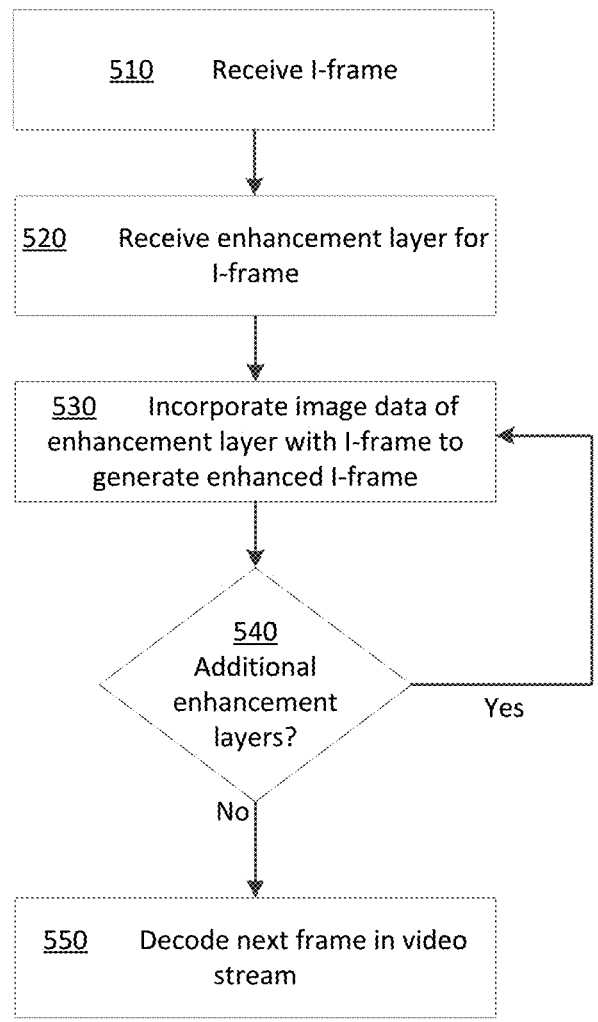
FIG. 6 depicts a flowchart illustrating an example process for enhanced LTR frame encoding and acknowledgement, in accordance with embodiments of the present disclosure.

FIG. 6 is a flowchart illustrating a first example process for enhanced LTR frame decoding and acknowledgement that may be used in accordance with the present disclosure. In some examples, the process of FIG. 6 may be performed by a recipient computing device (e.g., client) that requests a video streaming transmission, such as recipient 130 depicted in FIG. 1. Additionally, although not depicted in FIG. 6, the recipient computing device may send various acknowledgement messages to the transmitting computing device, in accordance with the techniques described above in reference to FIG. 4. For example, if the recipient computing device receives a corrupted LTR frame, the recipient computing device may send a negative acknowledgement message to the transmitting computing device. In another example, if recipient computing device receives enhancement layer data that may be used to enhance the quality of a particular LTR frame, the recipient may send an acknowledgement message that the enhancement layer was received. The process in FIG. 6 is described with reference to I-frames to illustrate an example of a type of LTR frame that may be used in accordance with the present disclosure. Although I-frames are described in FIG. 6, other LTR frames and other data frames may instead be used in accordance with the present disclosure.

The process of FIG. 6 may begin with a request by a recipient computing device that a video stream be sent. For example, recipient 130 may request that a video stream be sent from a transmitter computing device, such as transmitter 100 depicted in FIGS. 1A and 1B. In some examples, the transmission of the video stream may be requested as part of a broadcast to multiple recipients, such as a large-scale video broadcast. In some examples, the requested video stream may be sent using a communications protocol that is commonly employed for adaptive bitrate streaming, such as hypertext transfer protocol (HTTP).

The process of FIG. 6 may begin at operation 520 at which a first I-frame is received. For example, recipient 130 may identify a first I-frame (e.g., lower quality I-frame $I_0$ of FIG. 1A or 1B) of the requested video stream (e.g., video stream 142 depicted in FIG. 1). Recipient 130 may store the received I-frame (e.g., lower quality I-frame $I_0$) in a memory, such as buffer 132. The stored I-frame may then be used as a reference for subsequently received inter-coded frames of video stream 142. In various examples, recipient 130 may send an acknowledgement message upon receipt of the first I-frame. The acknowledgement message may acknowledge successful receipt of the first I-frame and may provide instructions to the encoder for encoding content of subsequent frames.

The process may continue from operation 510 to operation 520 at which an enhancement layer is received for the stored I-frame. For example, with reference to FIG. 4, recipient 130 may receive I-frame enhancement layer $L_1$. Recipient 130 may send an acknowledgement message upon receipt of the enhancement layer. The acknowledgement message may acknowledge successful receipt of the enhancement layer and may provide instructions to the encoder for encoding content of subsequent frames.

The process may continue from operation 520 to operation 530 at which the received enhancement layer may be combined with an I-frame to generate an enhanced I-frame. For example, with reference to FIG. 4, decoder 131 of recipient 130 may be effective to combine data in I-frame enhancement layer $L_1$ with the previously-stored I-frame to which I-frame enhancement layer $L_1$ corresponds. In the current example, I-frame enhancement layer $L_1$ may correspond to lower quality I-frame $I_0$, which may be stored in buffer 132. Accordingly, decoder 131 may combine data from I-frame enhancement layer $L_1$ (e.g., image data) with lower quality I-frame $I_0$ to generate an enhanced quality I-frame $I_0'$. The enhanced quality I-frame $I_0'$ may be stored in a memory such as buffer 132, and in some cases, may overwrite lower quality I-frame $I_0$.

The process may continue from operation 530 to operation 540 at which a determination is made whether additional I-frame enhancement layers have been received. If so, the process may return to operation 540 and the additional I-frame enhancement layers may be combined by decoder 131 with the corresponding I-frame stored in buffer 132. For example, if I-frame enhancement layer $L_2$ is received, decoder 131 may determine that I-frame enhancement layer $L_2$ corresponds to enhanced quality I-frame $I_0'$. Accordingly, decoder 131 may combine data from I-frame enhancement layer $L_2$ (e.g., image data) with enhanced quality I-frame $I_0'$ to generate another enhanced quality I-frame $I_0''$. Enhanced quality I-frame $I_0''$ may be a better reference for subsequently-received inter-coded frames relative to enhanced quality I-frame $I_0'$, as enhanced quality I-frame $I_0''$ may comprise more detailed image data relative to enhanced quality I-frame $I_0'$. The enhanced quality I-frame $I_0''$ may be stored in a memory such as buffer 132, and in some cases, may overwrite enhanced quality I-frame $I_0'$. As more I-frame enhancement layers are received, the reference quality may be progressively improved by combining the I-frame enhancement layers with the currently stored I-frame. In some examples, after receipt of all enhancement layers for a particular I-frame, decoder 131 may be effective to reassemble the full-quality I-frame (e.g., I-frame 120 depicted in FIG. 1) from the lower quality I-frame $I_0$ and the I-frame enhancement layers $L_1$-$L_N$.

The process may continue from operation 540 to operation 550 at which the next frame in the video stream may be decoded. For example, the next frame in video stream 142 received by recipient 130 may be a P-frame. In such a case, the P-frame may use the enhanced I-frame stored in buffer 132 as a reference frame. Indeed, in many cases, the full-quality I-frame (such as I-frame 120 depicted in FIG. 1) may have been reassembled by decoder 131 of the recipient 130. In such a case, decoder 131 may use the full-quality I-frame reassembled from the plurality of enhancement layers and the lower quality I-frame as a reference frame to decode the P-frame.

Among other benefits, a system in accordance with the present disclosure may allow progressive coding of high quality LTR frames (and/or other reference frames) while optimizing transmission characteristics of the bitstream. Sending lower quality reference frames may reduce jitter, latency and network traffic spikes during transmission. Additionally, reference frame enhancement layers may be used to progressively "regenerate" or "reassemble" the original, high-quality reference frame. Reference frame enhancement layers (e.g., LTR frame enhancement layers such as I-frame enhancement layers) may be sent together with inter-coded frames, such as P-frames and/or B-frames. In some cases, particular inter-coded frames may be selected for combination with the reference frame enhancement layers such that the combined hybrid blocks are unlikely to cause network congestion or other performance issues, based upon currently available bandwidth. Inter-coded frames received subsequently to reference frame enhancement layers may benefit from the enhanced reference frame resulting from the combination of the lower quality reference frame and the reference frame enhancement layers. Such subsequently-received inter-coded frames may be decoded using the enhanced reference frame. In various examples, video segments that include a relatively static background without a large amount of motion being depicted from frame-to-frame may be especially beneficial to encode using the techniques described herein. For such video segments, a lower quality LTR frame, or other reference frame, may be acceptable for decoding subsequent inter-coded frames until an enhanced quality LTR frame, or other reference frame, can be built up via the subsequently received enhancement layers. Examples of such "static background" video segments may include video conferences and/or other video-chat. Video segments that have large amounts of motion being depicted from frame-to-frame may not be ideal for the techniques described herein, as such "high motion" video segments may benefit more from higher quality LTR frames and/or from using additional bandwidth to enhance P-frames. Examples of such high motion video may include a sports video, a video depicting splashing water, a video depicting a car chase, or other videos with a rapidly changing background.

Figure 7:
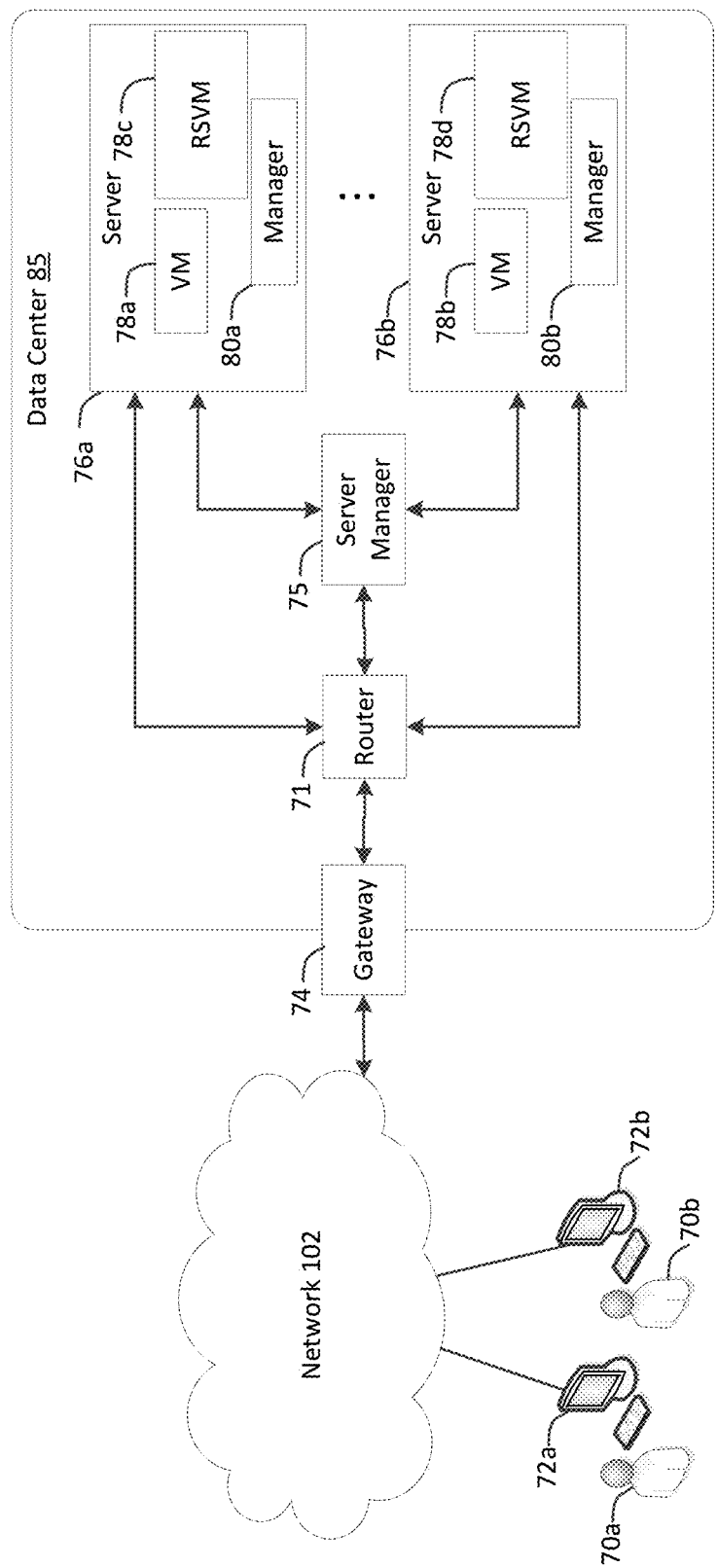
FIG. 7 is a diagram illustrating an example system for sending and providing data that may be used in accordance with the present disclosure.

An example system for sending and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via network 102. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 102 may, for example, be a publicly accessible network of linked networks and possibly operated by various distinct parties, such as the Internet. In other embodiments, network 102 may be a private network, such as a corporate or university network that is wholly or partially inaccessible to non-privileged users. In still other embodiments, network 102 may include one or more private networks with access to and/or from the Internet.

Network 102 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to network 102. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
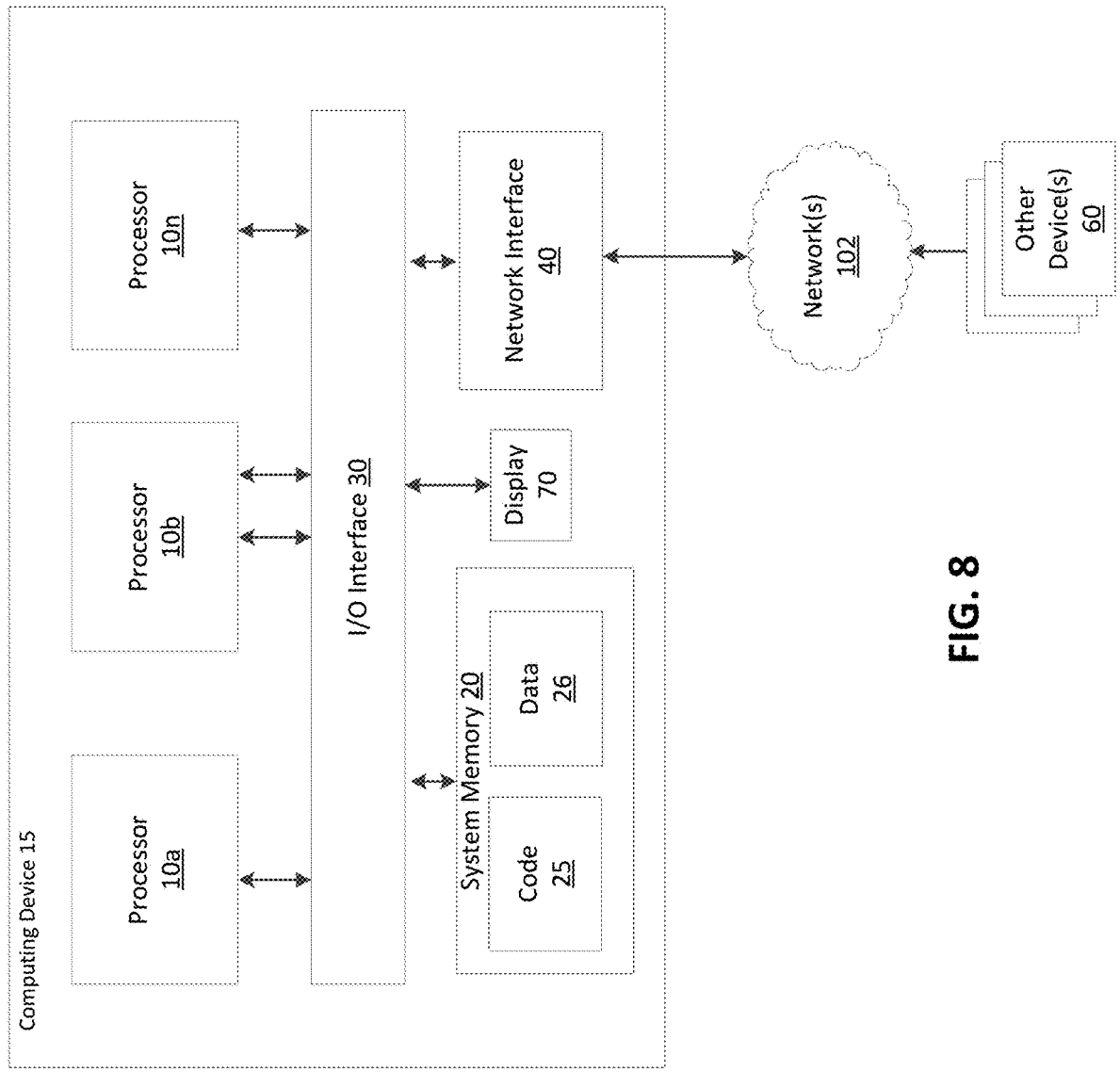
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30. In various other examples, computing device 15 may include a display 70 effective to display video stream 142 and/or other graphics.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA. In an example where transmitter 100 (depicted in FIGS. 1A and 1B, for example) is implemented by computing device 15, encoder 111 may be implemented by one or more of processors 10. In some examples, encoder 111 may comprise dedicated hardware, while in other examples, encoder 111 may be software executable by one or more of processors 10. In still other examples, encoder 111 may comprise some combination of hardware and software. For example, encoder 111 may be implemented through a combination of instructions stored in system memory 20 and executable by one or more of processors 10 and one or more dedicated processors, such as a graphical processing unit (GPU), application specific integrated circuit (ASIC), field programmable gate array (FPGA), or the like. Similarly, one or more of processors 10 may be effective to implement the network characteristics monitor 114 and data link monitor 116 described with reference to FIG. 1B. System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 20 as code 25 and data 26. In various examples, system memory 20 may comprise one or more of the buffers (e.g., buffer 132) described above with respect to FIGS. 1-2.

In an example where recipient 130 (depicted in FIGS. 1A and 1B, for example) is implemented by computing device 15, decoder 131 may be implemented by one or more of processors 10. In some examples, decoder 131 may comprise dedicated hardware, while in other examples, decoder 131 may be software executable by one or more of processors 10. In still other examples, decoder 131 may comprise some combination of hardware and software. For example, decoder 131 may be implemented through a combination of instructions stored in system memory 20 and executable by one or more of processors 10 and/or one or more dedicated processors, such as a graphical processing unit (GPU), application specific integrated circuit (ASIC), field programmable gate array (FPGA), or the like. Similarly, one or more of processors 10 may be effective to implement the playback component 133 described with reference to FIG. 1B.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 102, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory computer-readable storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of sending a video stream, the method comprising:
   identifying, by a server device, a first long term reference frame ("LTR frame") of video data;
   identifying first image data of the first LTR frame;
   generating a first reference frame enhancement layer frame comprising the first image data;
   identifying second image data of the first LTR frame;
   generating a second reference frame enhancement layer frame comprising the second image data;
   generating a lower quality LTR frame by deleting at least the first image data and the second image data from the first LTR frame;
   sending the lower quality LTR frame to a recipient device;
   initiating a first acknowledgement timer when sending the lower quality LTR frame to the recipient device;
   sending the first reference frame enhancement layer frame to the recipient device, wherein the recipient device is effective to combine first pixel value difference data of the first image data with the lower quality LTR frame to produce a first enhanced quality LTR frame;
   initiating a second acknowledgement timer when sending the first reference frame enhancement layer frame;
   receiving a first acknowledgement message from the recipient device that the lower quality LTR frame was received, wherein the first acknowledgement message is received before a first timeout of the first acknowledgement timer;
   determining that the second acknowledgement timer has experienced a second timeout; and
   resending the first reference frame enhancement layer frame to the recipient device.

2. The method of claim 1, further comprising:
sending, by the recipient device, the first acknowledgement message that the lower quality LTR frame was received by the recipient device;
receiving, by the recipient device, the first reference frame enhancement layer frame;
sending a second acknowledgement message to the server device, wherein the second acknowledgement message confirms receipt by the recipient device of the first reference frame enhancement layer frame;
incorporating, by the recipient device, the first pixel value difference data of the first image data with the lower quality LTR frame to produce the first enhanced quality LTR frame; and
decoding, by the recipient device, inter-coded frame data using the first enhanced quality LTR frame as a reference frame.

3. The method of claim 1, further comprising:
sending, by the recipient device, a negative acknowledgement message, wherein the negative acknowledgement message indicates failure by the recipient device to receive an uncorrupted version of the second reference frame enhancement layer frame;
receiving, by the recipient device, the second reference frame enhancement layer frame;
sending, by the recipient device, a second acknowledgement message to the server device, wherein the second acknowledgement message confirms receipt by the recipient device of the second reference frame enhancement layer frame; and
incorporating, by the recipient device, second pixel value difference data of the second reference frame enhancement layer frame with the first enhanced quality LTR frame to produce a second enhanced quality LTR frame.

4. A method of encoding and sending video, the method comprising:
generating first reference frame data;
generating first enhancement layer data corresponding to the first reference frame data;
generating first combination frame data by combining the first enhancement layer data with first inter-coded frame data;
generating second enhancement layer data corresponding to the first reference frame data, wherein at least one of the first enhancement layer data and the second enhancement layer data is combinable with the first reference frame data to generate enhanced quality reference frame data;
generating second combination frame data by combining the second enhancement layer data with second inter-coded frame data;
sending the first reference frame data to a recipient computing device;
sending the first combination frame data to the recipient computing device;
sending the second combination frame data to the recipient computing device;
determining that the recipient computing device did not receive first unreceived data, wherein the first unreceived data comprises at least one of the first reference frame data, the first enhancement layer data, and the second enhancement layer data; and
resending the first unreceived data to the recipient computing device.

5. The method of claim 4, further comprising:
encoding the first reference frame data with a first reference quality, wherein the first reference quality is lower than an original reference quality of an original reference frame data used to generate the first reference frame data.

6. The method of claim 5, further comprising generating the first reference frame data, the first enhancement layer data corresponding to the first reference frame data, and the second enhancement layer data corresponding to the first reference frame data by applying a wavelet based image transform to the original reference frame data.

7. The method of claim 4, further comprising:
receiving a request for third enhancement layer data corresponding to a region of interest in the first reference frame data;
generating the third enhancement layer data corresponding to the region of interest in the first reference frame data; and
sending the third enhancement layer data to the recipient computing device.

8. The method of claim 4, further comprising:
receiving a request to improve a reference quality of a video being sent to the recipient computing device; and
sending third enhancement layer data corresponding to the first reference frame data, wherein the third enhancement layer data is effective to improve the reference quality of the first reference frame data.

9. The method of claim 4, further comprising:
determining an amount of time that has elapsed since sending the first reference frame data to the recipient computing device; and
receiving negative acknowledgement message data from the recipient computing device prior to the amount of time exceeding a timeout threshold, wherein the negative acknowledgement message data corresponds to the first reference frame data.

10. The method of claim 4, further comprising:
receiving an indication from the recipient computing device that at least one of the first reference frame data, the first enhancement layer data, or the second enhancement layer data was not received by the recipient computing device.

11. The method of claim 4, further comprising:
determining an amount of time that has elapsed since sending the first reference frame data to the recipient computing device; and
determining that the amount of time exceeds a timeout threshold.

12. The method of claim 4, further comprising:
identifying a region of interest in the first reference frame data;
generating third enhancement layer data comprising metadata associated with the region of interest; and
sending the third enhancement layer data to the recipient computing device.

13. The method of claim 4, further comprising:
monitoring network characteristics of a communication channel with the recipient computing device; and
determining that a first amount of bandwidth is available to resend the first unreceived data to the recipient computing device at a first time, wherein the resending the first unreceived data to the recipient computing device is performed at the first time.

14. A method of encoding and sending a video, the method comprising:
generating first reference frame data;
generating first enhancement layer data corresponding to the first reference frame data;
generating first combination frame data by combining the first enhancement layer data with first inter-coded frame data;
generating second enhancement layer data corresponding to the first reference frame data, wherein at least one of the first enhancement layer data and the second enhancement layer data is combinable with the first reference frame data to generate enhanced quality reference frame data;
generating second combination frame data by combining the second enhancement layer data with second inter-coded frame data;
sending the first reference frame data to a recipient computing device;
sending the first combination frame data to the recipient computing device;
sending the second combination frame data to the recipient computing device;
receiving, from the recipient computing device, instructions related to encoding of subsequent image data in the video;
encoding the subsequent image data based at least in part on the instructions; and
sending the subsequent image data to the recipient computing device.

15. The method of claim 14, further comprising:
encoding the first reference frame data with a first reference quality, wherein the first reference quality is lower than an original reference quality of an original reference frame data used to generate the first reference frame data.

16. The method of claim 15, further comprising:
generating the first reference frame data, the first enhancement layer data corresponding to the first reference frame data, and the second enhancement layer data corresponding to the first reference frame data by applying a wavelet based image transform to the original reference frame data.

17. The method of claim 14, further comprising:
receiving a request for third enhancement layer data corresponding to a region of interest in the first reference frame data;
generating the third enhancement layer data corresponding to the region of interest in the first reference frame data; and
sending the third enhancement layer data to the recipient computing device.

18. The method of claim 14, further comprising:
receiving a request to improve a reference quality of a video being sent to the recipient computing device; and
sending third enhancement layer data corresponding to the first reference frame data, wherein the third enhancement layer data is effective to improve the reference quality of the first reference frame data.

19. The method of claim 14, further comprising:
determining an amount of time that has elapsed since sending the first enhancement layer data to the recipient computing device; and
receiving negative acknowledgement message data from the recipient computing device prior to the amount of time exceeding a timeout threshold, wherein the negative acknowledgement message data corresponds to the first enhancement layer data.

20. The method of claim 14, further comprising:
identifying a region of interest in the first reference frame data;
generating third enhancement layer data comprising metadata associated with the region of interest; and
sending the third enhancement layer data to the recipient computing device.

* * * * *